No. 856,816. PATENTED JUNE 11, 1907.
H. B. SHERMAN.
NOZZLE.
APPLICATION FILED OCT. 17, 1906.
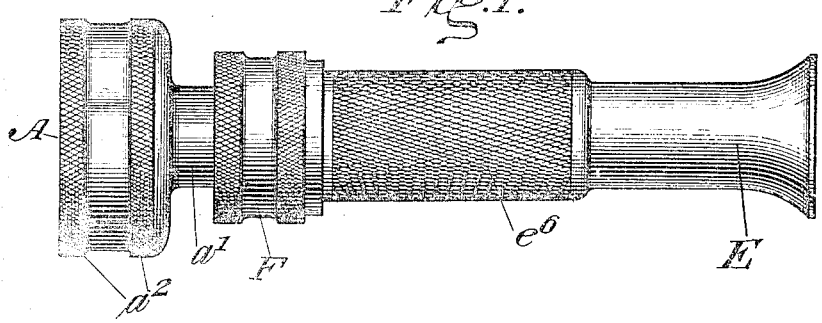
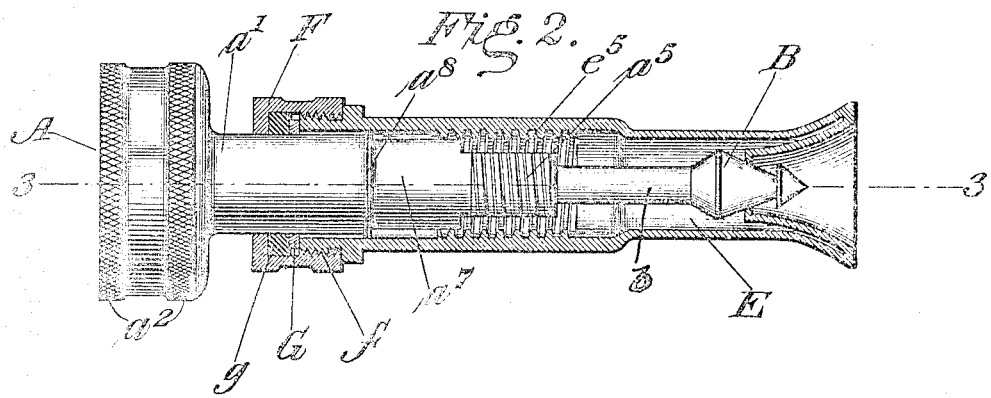
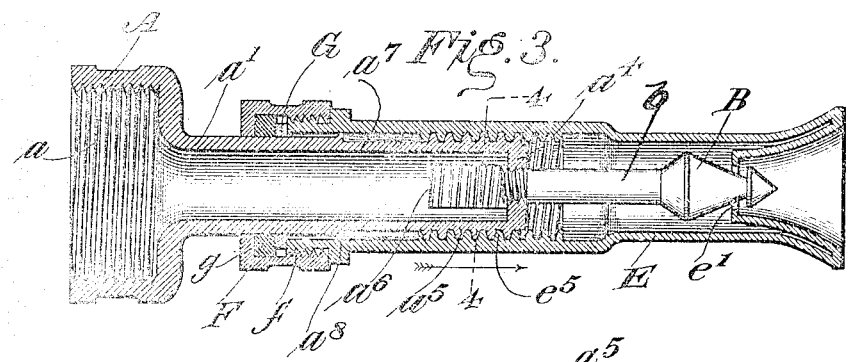
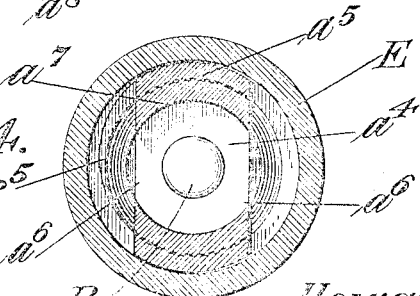
WITNESSES: INVENTOR:
Howard B. Sherman
By Alexander & Dowell
Attorneys

# UNITED STATES PATENT OFFICE.

HOWARD B. SHERMAN, OF BATTLE CREEK, MICHIGAN.

NOZZLE.

No. 856,816.  Specification of Letters Patent.  Patented June 11, 1907.

Application filed October 17, 1906. Serial No. 339,351.

*To all whom it may concern:*

Be it known that I, HOWARD B. SHERMAN, of Battle Creek, in the county of Calhoun and State of Michigan, have invented certain new and useful Improvements in Nozzles; and I hereby declare that the following is a full, clear, and exact description thereof, reference being had to the accompanying drawings, which form part of this specification.

This invention is an improvement in nozzles and its object is to simplify the construction and reduce the cost thereof, to form the same with a less number of parts, and provide ample water-ways when the nozzle is open and to improve its appearance.

The invention in particular is an improvement upon the nozzles shown in my Letters Patent 742,133 of October 20, 1903, and 797,927 of August 22, 1905. In my Patent 742,133 the base and spindle were formed of separate parts, the base being formed of drawn metal and the spindle had an internal water-way and was formed out of rod-metal cut to proper shape and bored and threaded and fastened to the tubular neck of the base so as to form therewith a spindle of the proper length. In my Patent 797,927 I economized metal by making the spindle of a solid rod with an external water passage way, and fastened this rod portion to the tubular neck of the base. Both of these aforesaid constructions necessitated a good deal of tool work on the spindle, and involved considerable waste of metal in cutting the spindle to the desired form.

In my present invention I use the same base blank, such as I used in my aforesaid patented nozzles,—to form the base, but draw the neck of such blank out much longer than I did in my previous nozzles, and make the body of the spindle therefrom,—such body containing the entire internal water passage way of the spindle, and I also form on the inner end of such spindle portion the male threads for engagement with the sleeve. I attach to the inner end of this tubular spindle portion of the base a short valve tip, which may be made of rod metal. By this construction I greatly reduce the cost of production, economize metal, and save labor and produce what I consider a superior nozzle to those shown in my aforesaid patents.

The present invention will be clearly understood from the following description in connection with the accompanying drawings, in which—

Figure 1 is a side elevation of the complete nozzle. Fig. 2 is a view showing the sleeve and stuffing box in section and the spindle and base in elevation. Fig. 3 is a longitudinal section on the line 3—3 of Fig. 2, showing the nozzle partly open. Fig. 4 is an enlarged transverse section on line 4—4 of Fig. 3.

In the present invention the base A has an internally threaded portion $a$, and exterior milled portions $a^2$, and a neck $a'$, substantially as shown in my Patent 742,133, but this neck $a'$ is elongated by continuing the drawing operation into a tubular spindle portion and is drawn closed at its inner end. The end wall $a^4$ of this tubular extension forms a support for the valve B which is attached thereto. The inner end of the spindle portion is exteriorly threaded as at $a^5$ for engagement with the internal threads $e^5$ of the sleeve E, which sleeve is preferably constructed as in my Patent 797,927, being made of drawn metal and adapted to inclose the spindle portion and valve and is provided with a flared outer end having an opening $e'$ adapted to be closed by the valve B, when the sleeve is screwed fully onto the spindle. The sleeve has a milled portion $e^6$ exterior to the threaded part $e^5$ which facilitates manipulation of the sleeve and enhances its appearance.

The threaded portion $a^5$ of the tubular extension of the base is cut away on opposite sides, as shown in the drawings, to form water outlets $a^6$, through which the water escapes laterally into the sleeve and passes thence to the outlet $e'$. The spindle portion may be slightly reduced in external diameter in rear of the threaded portion $a^5$, as shown at $a^7$, this portion $a^7$ being covered by the sleeve E. Between this portion $a^7$ and the base proper is slipped a stuffing box F, which is preferably constructed as in my Patent 797,927, and which has a threaded engagement with the inner end of sleeve E, as shown at $f$, and between the flange of the stuffing box and inner end of sleeve E is a washer $g$ of suitable material retained by a metal ring G which is strung on the spindle portion and is interposed between the washer and the inner end of the sleeve. After the stuffing box has been slipped on the spindle portion the washer g, is slipped thereon, then the ring G, and then a small flange or rim $a^8$ is turned up at the inner end of the part $a^7$ by upsetting the metal. Said rim retains the ring G on the neck and prevents it escaping therefrom, consequently when the sleeve E is put in place and the stuffing box is screwed onto the inner end of the sleeve the latter will be securely held upon the base although free to rotate and slide thereon to the extent permitted by the rim $a^8$, and the base A. This manner of fastening the stuffing box and sleeve upon the spindle is a very simple and effective construction.

The valve B is turned out of a metal rod of proper diameter and has a short stem b which is attached to the inner end of $a^4$ of the spindle extension of the base. It may be secured thereto in any suitable manner and is shown as screwed thereto in the drawing.

As above stated, this construction is superior, more economical of metal, and I think is stronger than the nozzles shown in either of my said patents.

Having described my invention what I claim as new and desire to secure by Letters Patent is:—

1. In a hose nozzle, a base and spindle portion constructed in one part from drawn metal, the spindle portion being a tubular integral extension of the base, the inner end of said spindle portion being closed and exteriorly threaded and having a lateral outlet for the passage of water in the threaded portion; with a valve attached to the inner end of the spindle portion, and a sleeve surrounding the spindle, and internally threaded to engage the threads on the spindle portion.

2. In a hose nozzle, a base and tubular spindle portion constructed in one part from drawn metal, the spindle portion being a tubular integral extension of the base and having its inner end closed and exteriorly threaded and provided with openings in opposite sides of the threaded portion for the passage of water, with a rod metal valve attached to the inner end of the spindle portion, a sleeve surrounding the spindle and internally threaded to engage the threads on the spindle portion, and a stuffing box on the spindle engaged with the sleeve.

3. In a hose nozzle, the combination of a base and spindle portion formed of one piece of drawn metal, the spindle portion having its inner end closed and exteriorly threaded and provided with openings in the threaded portion for the escape of water, the part of the spindle immediately in rear of the threaded portion being slightly reduced in exterior diameter; with a stuffing box slipped on the spindle portion, a ring within the stuffing box confined upon the spindle portion by a flange upset thereon, a sleeve inclosing the spindle portion and having internal threads engaging the external threads on the spindle portion, and also having a threaded end engaging the stuffing box.

4. In a hose nozzle, the combination of a drawn metal base and tubular spindle portion formed integrally of one piece of drawn metal, the spindle portion having its inner end closed and exteriorly threaded and having an opening in the threaded portion for the escape of water, a stuffing box slipped on the spindle portion, a washer and ring within the stuffing box, the ring being confined upon the spindle portion by an upset flange on the spindle, and a valve formed of rod metal attached to the inner end of the spindle portion; with a sleeve inclosing the valve and spindle portion and having internal threads engaging the external threads on the spindle portion, and also having a threaded end engaging the threads of the stuffing box.

In testimony that I claim the foregoing as my own, I affix my signature in presence of two witnesses.

HOWARD B. SHERMAN.

Witnesses:
FRANK M. ANDRESS,
FRED HAMILTON.